(12) United States Patent
Ito et al.

(10) Patent No.: US 8,776,944 B2
(45) Date of Patent: Jul. 15, 2014

(54) ON-VEHICLE ACOUSTIC DEVICE AND METHOD OF ASSEMBLING THE SAME

(71) Applicants: Ryo Ito, Fukushima (JP); Masami Imai, Fukushima (JP); Takashi Kanari, Fukushima (JP); Masami Anzai, Fukushima (JP); Arata Tada, Fukushima (JP)

(72) Inventors: Ryo Ito, Fukushima (JP); Masami Imai, Fukushima (JP); Takashi Kanari, Fukushima (JP); Masami Anzai, Fukushima (JP); Arata Tada, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/627,414

(22) Filed: Sep. 26, 2012

(65) Prior Publication Data
US 2013/0126263 A1  May 23, 2013

(30) Foreign Application Priority Data
Nov. 2, 2011  (JP) ................................. 2011-241133

(51) Int. Cl.
*H04R 1/02* (2006.01)
*B60R 11/02* (2006.01)
*B60R 11/00* (2006.01)

(52) U.S. Cl.
CPC ..... *B60R 11/0223* (2013.01); *B60R 2011/0028* (2013.01)
USPC .............. 181/151; 181/150; 381/86; 381/389

(58) Field of Classification Search
USPC ....................... 181/150, 151; 381/86, 87, 389
See application file for complete search history.

(56) References Cited

U.S. PATENT DOCUMENTS

| | | | | | |
|---|---|---|---|---|---|
| 4,056,165 | A | * | 11/1977 | Okamoto et al. | 181/141 |
| 4,847,907 | A | * | 7/1989 | Ando | 381/86 |
| 4,993,510 | A | * | 2/1991 | Kato et al. | 181/141 |
| 5,532,437 | A | * | 7/1996 | Simplicean et al. | 181/150 |
| 5,699,438 | A | * | 12/1997 | Smith et al. | 381/386 |
| 5,739,481 | A | * | 4/1998 | Baumhauer et al. | 181/148 |
| 5,754,664 | A | * | 5/1998 | Clark et al. | 381/86 |
| 6,456,722 | B1 | * | 9/2002 | Davey et al. | 381/389 |
| 7,162,048 | B2 | * | 1/2007 | Shima | 381/334 |
| 2009/0208026 | A1 | * | 8/2009 | Nichols et al. | 381/71.4 |

FOREIGN PATENT DOCUMENTS

| | | |
|---|---|---|
| JP | 2005-35499 Y | 5/1993 |
| JP | 2006-62694 | 9/1994 |
| JP | 2007-42288 Y | 7/1995 |

\* cited by examiner

*Primary Examiner* — Jeremy Luks
(74) *Attorney, Agent, or Firm* — Brinks Gilson & Lione

(57) ABSTRACT

An opening is formed in a ceiling lining of a vehicle cabin part. The diameter of the opening in the ceiling lining is smaller than a diameter of a speaker, which has a frame. The speaker is disposed at the opening, and a fixing screw is inserted into a fixing aperture formed in a central part of the speaker. A fixing screw is screwed to a screw hole formed in a reinforcing brace positioned at an inner side of a top plate proximate the ceiling of the vehicle. A central part of the speaker is fixed to the reinforcing brace while a circumferential periphery of the frame is pressed against a peripheral edge of the opening in the ceiling lining via a frame interposing material.

20 Claims, 3 Drawing Sheets

ON-VEHICLE ACOUSTIC DEVICE AND METHOD OF ASSEMBLING THE SAME

This application claims the benefit of Japanese Patent Application No. 2011-241133, filed on Nov. 2, 2011, and which is incorporated by reference herein in its entirety.

BACKGROUND

1. Field of the Invention

The present invention relates to an on-vehicle acoustic device in which a speaker is mounted on a ceiling part of a car cabin of a car and a method of assembling the same.

2. Description of the Related Art

As an on-vehicle acoustic device in the related art, JP 5-35499 Y (CD-ROM) and JP 7-42288 Y (CD-ROM) disclose an on-vehicle acoustic device in which a speaker is mounted on a rear tray of a car.

Each of these on-vehicle acoustic devices has an opening part formed in the rear tray of the car and a bracket mounted on a steel plate of the car positioned at an inward part of the rear tray. A central part of the speaker is inserted into the opening part, and an external peripheral part of a fame of the speaker is disposed at a periphery of the opening part. Further, a fixing screw is inserted into a fixing hole which passes through the central part of the speaker, so that the fixing screw is fixed to the bracket.

JP 6-62694 Y (CD-ROM) discloses an on-vehicle acoustic device in which an opening is formed in an inner wall plate of a car door, and a fixing angle is fixed at an internal surface of an interior plate. The central part of the speaker is inserted into the opening, and the external peripheral part of the frame of the speaker is disposed on a surface of the interior plate. Further, the fixing screw is inserted into the fixing hole which passes through the central part of the speaker, and the fixing screw is screwed to the fixing angle.

In the on-vehicle acoustic devices in the related art, as disclosed in JP 5-35499 Y, JP 7-42288 Y, and JP 6-62694 Y, a position at which the speaker is mounted is limited to the rear tray or the car door. Therefore, there is limitation of improvement of sound quality in a car cabin. Further, since the size of the speaker disposed at the rear tray or the car door is limited, it is difficult to mount a woofer having a large diameter, for example.

Each of the on-vehicle acoustic devices disclosed in JP 5-35499 Y and JP 7-42288 Y has a structure in which the opening part is formed in the rear tray formed of hard plate material and the central part of the speaker is inserted into the opening part, so that the external peripheral part of the frame of the speaker is disposed on a surface of the hard plate material. Therefore, it is difficult, with such a mounting structure in the related art, to mount the speaker on a ceiling part to which a relatively soft interior lining is provided.

JP 6-62694 Y discloses that the speaker can be mounted on the ceiling and the like other than the car door. However, since JP 6-62694 Y has the structure in which the fixing angle is fixed to an inner side of the hard plate material, and the fixing screw provided at the central part of the speaker is screwed to the fixing angle, it is hardly possible to mount the speaker on the ceiling part with the mounting structure disclosed in JP 6-62694 Y.

SUMMARY

The present invention solves the above-described problem of the related art, and an object of the invention is to provide an on-vehicle acoustic device which enables a speaker to be mounted on a ceiling part having a relatively soft ceiling lining, and a method of assembling the same.

The present invention provides an on-vehicle acoustic device in which a speaker is mounted on a ceiling part of a car, the speaker including a frame supporting an external periphery of a vibrating plate, a central part supporting a magnetic driving unit for driving the vibrating plate, and a fixing hole passing through the central part, a top plate, a reinforcing material (or reinforcing brace) provided at an inner side of the top plate, and a ceiling lining covering the top plate and the reinforcing material from an inside being provided to the ceiling part, and an opening part having an inner diameter smaller than a diameter of the frame being formed in a region facing the reinforcing material of the ceiling lining, and a peripheral edge part of the opening part of the ceiling lining being pressed toward the top plate from an inside of a car cabin at an external peripheral part of the frame, so that the central part is positioned inside the opening part, and the central part being fixed to the reinforcing material with the fixing hole.

In the on-vehicle acoustic device of the present invention, since the central part of the speaker is fixed to the reinforcing material of the ceiling part, the speaker can be firmly fixed to the ceiling part. The opening part having an inner diameter smaller than the diameter of the frame of the speaker is formed in the ceiling lining provided at the ceiling part, and the external peripheral part of the frame is pressed against the ceiling lining at the peripheral edge part of the opening part. Therefore, the ceiling lining can be used as a baffle wall, and sound pressure of a space between the top plate and the ceiling lining can be prevented from leaking into the interior of the car cabin, so that the sound inside the car cabin becomes better. Further, even when a large woofer is mounted, a sufficient space can be secured.

In the present invention, it is preferable to provide a frame interposing material formed of an elastic material between the external peripheral part of the frame and the peripheral edge part of the opening part of the ceiling lining.

A gap between the frame and the ceiling lining is less likely to be formed by providing the frame interposing material, whereby blocking effect between a space between the ceiling lining and the top plate, and the car cabin can be increased.

In the present invention, a central interposing material formed of an elastic material is disposed between the central part and the reinforcing material, and a fixing screw inserted into the fixing hole is screwed to the reinforcing material, so that the central part is fixed to the reinforcing material via the central interposing material.

Alternatively, an external peripheral interposing material formed of an elastic member is disposed between the top plate or the reinforcing material, and the peripheral edge part of the opening part of the ceiling lining, and a fixing screw inserted into the fixing hole is screwed to the reinforcing material, so that the peripheral edge part of the opening part of the ceiling lining is interposed between the external peripheral part of the frame and the external peripheral interposing material.

The fixing screw can be screwed to the reinforcing material without slack by providing the central interposing material or the external peripheral interposing material. Further, direct action of vibration of the speaker on the reinforcing material or the top plate can be prevented.

In the present invention, a sound absorbent material larger than the frame in area may be provided at an inner side of the top plate and the reinforcing material.

Alternatively, in the on-vehicle acoustic device of the present invention, the central part may be fixed to the reinforcing material with wire rod or belt rail inserted into the fixing hole and wound around the reinforcing material.

In the above-described mounting structure, the speaker can be firmly fixed to the reinforcing material without forming a female screw hole in the reinforcing material.

Next, the present invention provides a method of assembling an on-vehicle acoustic device for mounting a speaker including a frame supporting an external periphery of a vibrating plate and a central part supporting a magnetic driving unit for driving the vibrating plate on a ceiling part of a car provided with a top plate, a reinforcing material provided at an inner side of the top plate, and a ceiling lining covering the top plate and the reinforcing material from an inside, the method including:

forming an opening part having an inner diameter smaller than a diameter of the frame in a region facing the reinforcing material of the ceiling lining; and positioning the central part inside the opening part while a peripheral edge part of the opening part of the ceiling lining is pressed toward the top plate from an inside of a car cabin at an external peripheral part of the frame, and fixing the central part to the reinforcing material with a fixing hole passing through the central part.

The method of assembling an on-vehicle acoustic device of the present invention enables the speaker to be easily mounted from the inside of the car cabin without the necessity of removing the ceiling lining of the ceiling part or disassembling a car body.

In the method of assembling an on-vehicle acoustic device of the present invention, it is preferable to dispose a frame interposing material formed of an elastic material between the external peripheral part of the frame and the peripheral edge part of the opening part of the ceiling lining.

In the present invention, a central interposing material formed of an elastic material is disposed between the central part and the reinforcing material, and a fixing screw inserted into the fixing hole is screwed to the reinforcing material, so that the central part is fixed to the reinforcing material via the central interposing material.

Alternatively, an external peripheral interposing material formed of an elastic member is disposed between the top plate or the reinforcing material, and the peripheral edge part of the opening part of the ceiling lining, and a fixing screw inserted into the fixing hole is screwed to the reinforcing material, so that the peripheral edge part of the opening part of the ceiling lining is interposed between the external peripheral part of the frame and the external peripheral interposing material.

In the present invention, a sound absorbent material larger than the frame in area can be provided at an inner side of the top plate and the reinforcing material.

Alternatively, in the method of assembling an on-vehicle acoustic device of the present invention, the central part can be also fixed to the reinforcing material with wire rod or belt rail inserted into the fixing hole and wound around the reinforcing material.

Since the on-vehicle acoustic device of the present invention uses the ceiling part inside the car cabin, a large space can be used for disposing the speaker, whereby, for example, a woofer having a large diameter can be disposed.

The opening part having an internal diameter smaller than the diameter of the frame of the speaker is formed in the ceiling lining, and the external peripheral part of the frame is pressed against the ceiling lining at the peripheral edge part of the opening part, whereby a gap is less likely to be formed between the frame and the ceiling lining. Further, blocking effect between a space between the ceiling lining and a top plate, and the car cabin is increased by using the ceiling lining as a baffle wall, whereby the sound quality can be improved.

Further, the method of assembling the on-vehicle acoustic device of the present invention enables mounting of the speaker from the inside of the car cabin without removing the ceiling lining or disassembling the ceiling part.

DETAILED DESCRIPTION

Figures 1, 2:
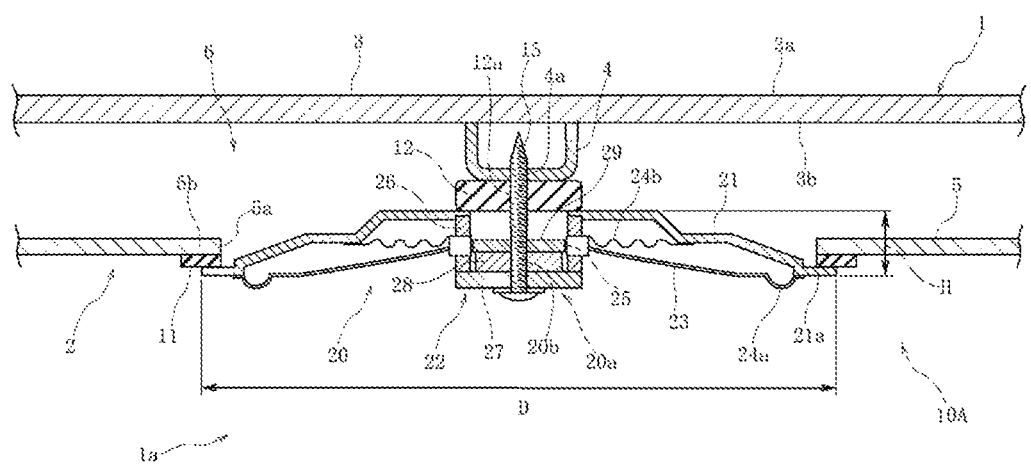
FIG. 1 is a cross-sectional view showing an on-vehicle acoustic device according to a first embodiment of the present invention.
FIG. 2 is a cross-sectional view showing an on-vehicle acoustic device according to a second embodiment of the present invention.

An on-vehicle acoustic device 10A of a first embodiment shown in FIG. 1 is provided to a ceiling part 2 of a car 1.

Figure 6:
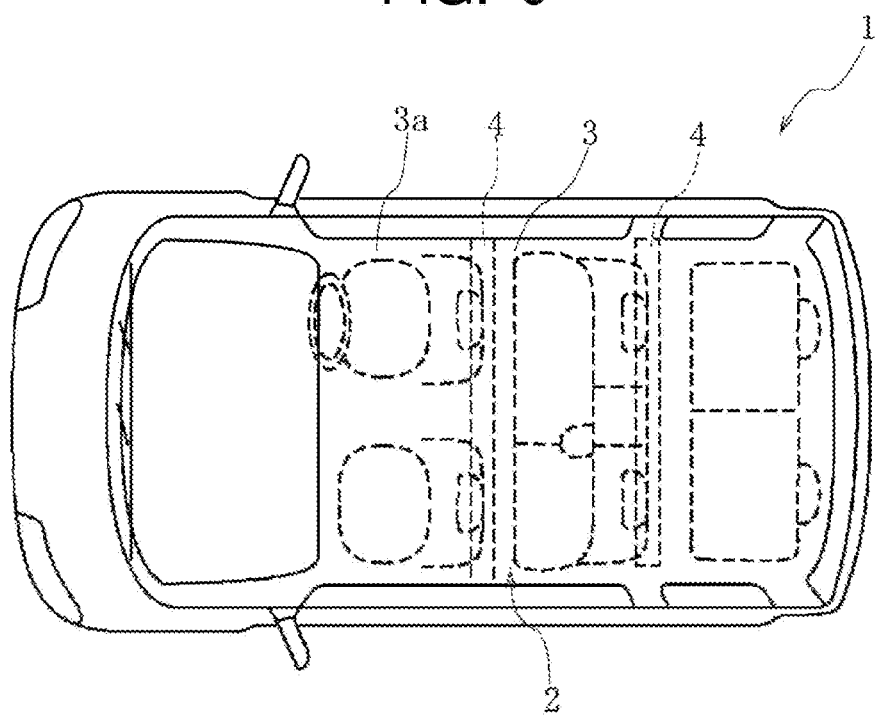
FIG. 6 is a plan view of a car on which the on-vehicle acoustic device of each embodiment is mounted.

The car 1 is, for example, a minivan type automobile shown in FIG. 6. A top plate 3 made of a metal plate shown in FIG. 1 is provided to the ceiling part 2 of the car. An external surface 3a of the top plate 3 is an exterior surface of the car 1. A reinforcing material, also referred to as a reinforcing brace 4 is fixed to an internal surface 3b of the top plate 3. The reinforcing material 4 is a reinforcing frame or brace formed of steel channel material, is disposed so as to cross the ceiling part 2 of the car in the right-left direction as shown in FIG. 6, and is fixed to the top plate 3 by means of welding or the like.

As shown in FIG. 1, a ceiling lining 5 is provided closer to an inside of a car cabin 1a than the top plate 3 and the reinforcing material 4. The ceiling lining 5 is formed of synthetic leather which is softer than steel material but has slightly higher rigidity than a resin sheet. The ceiling lining 5 covers the top plate 3 and the reinforcing material 4 from a position apart from the top plate 3 and the reinforcing material 4 and closer to the inside of the car cabin 1a than the top plate 3 and the reinforcing material 4, and a space 6 is formed between the ceiling lining 5, and the top plate 3 and the reinforcing material 4.

The on-vehicle acoustic device 10A has a speaker 20 mounted on the ceiling part 2. The speaker 20 is large and thin with a diameter D of 15 to 25 cm and a height H of 2 to 5 cm, and is a so-called "woofer" for generating low-pitched tones. As a practical example, the diameter D is 20 cm and the height H is 2.5 cm. The reinforcing material or reinforcing brace 4 and may be formed in any suitable shape so as to mount or fix the speaker 20 relative to the top plate 3.

The speaker 20 includes a circular frame 21 made of non-magnetic metal material or synthetic resin and a magnetic driving unit 22 provided to a central part 20a of the frame 21. A vibrating plate 23 called "cone" is provided at a front part of the frame 21, and an external peripheral part of the vibrating plate 23 is supported to an external peripheral part 21a of the frame 21 via an external peripheral damper 24a. An internal peripheral part of the vibrating plate 23 and the frame 21 are connected by an internal peripheral damper 24b, and the vibrating plate 23 is vibratably supported. A voice coil 25 is provided at the internal peripheral part of the vibrating plate 23.

As shown in FIG. 1, the magnetic driving unit 22 provided at the central part 20a includes a cylindrical external peripheral yoke 26 formed of magnetic material, a tip part yoke 27 made of magnetic material and fixed to a tip part of the external peripheral yoke 26, a magnet 28 fixed to an internal surface of the tip part yoke 27 at an inner side of the external peripheral yoke 26, and a middle yoke 29 made of magnetic material and fixed to an inner side of the magnet 28. The voice coil 25 is movably inserted into a space gap between an internal peripheral surface of the external peripheral yoke 26 and an external peripheral surface of the middle yoke 29.

A fixing hole 20b which passes through the central parts of the tip part yoke 27, the magnet 28, and the middle yoke 29 in the front-back direction is formed in the central part 20a of the speaker 20.

Next, a method of assembling the on-vehicle acoustic device 10A in which the speaker 20 is mounted on the ceiling part 2 will be described.

An opening part 5a is formed in a region which faces the reinforcing material 4 of the ceiling lining 5 in the ceiling part 2. The opening part 5a is formed by circularly cutting the ceiling lining 5. The opening part 5a has a circular form, and the center thereof is caused to coincide with the center of the reinforcing material 4 in the width direction. The inner diameter of the opening part 5a is slightly smaller than the diameter D of the speaker 20.

A female screw hole 4a is processed at one part of the reinforcing material 4. The female screw hole 4a is positioned at the center of curvature of the opening part 5a formed in the ceiling lining 5.

As shown in FIG. 1, a frame interposing material 11 is attached to a face of the ceiling lining 5 facing the inside of the car cabin 1a and to a peripheral edge part 5b of the opening part 5a. Alternatively, the frame interposing material 11 may be attached to a face facing the ceiling lining 5 at the external peripheral part 21a of the frame 21 of the speaker 20. The frame interposing material 11 is formed of an elastic material, and is, for example, formed of foamed synthetic resin.

When the speaker 20 is mounted, the central part 20a is introduced into the space 6 through the opening part 5a. At this time, a central interposing material 12 is interposed between the central part 20a of the speaker 20 and the reinforcing material 4. The central interposing material 12 is formed of synthetic rubber and is harder than the frame interposing material 11. A through hole 12a is formed in the center of the central interposing material 12.

As shown in FIG. 1, a fixing screw 15 is inserted into the fixing hole 20b of the speaker 20 and the through hole 12a of the central interposing material 12, and is screwed to the female screw hole 4a of the reinforcing material 4. The frame interposing material 11 is pressed by the external peripheral part 21a of the frame 21 by tightening the fixing screw 15, and further, the peripheral edge part 5b of the opening part 5a at the ceiling lining 5 is pressed toward the top plate 3 from the inside of the car cabin 1a. Further, the central part 20a is fixed to the reinforcing material 4 by the fixing screw 15 via the central interposing material 12.

In the assembled on-vehicle acoustic device 10A, the external peripheral part 21a of the frame 21 of the speaker 20 is pressed against the peripheral edge part 5b of the ceiling lining 5 via the frame interposing material 11. Since the ceiling lining 5 is stretched with predetermined tension, a space between the external peripheral part 21a of the frame 21 and the peripheral edge part 5b can be closed by simply pressing the external peripheral part 21a.

That is, since the ceiling lining 5 has the tension, the frame interposing material 11, attached to the ceiling lining 5 by an adhesive or the like, and the external peripheral part 21a can be stuck together by pressing force occurring when the frame 21 is mounted, even if the frame interposing material 11 and the external peripheral part 21a of the frame 21 are not adhered to each other. Also, when the frame interposing material 11 is attached to the external peripheral part 21a of the frame 21 by an adhesive or the like, the frame interposing material 11 and the ceiling lining 5 can be stuck together by the pressing force occurring when the frame 21 is mounted, even if the frame interposing material 11 and the ceiling lining 5 are not adhered to each other.

Note that the frame interposing material 11 may be adhered to both of the external peripheral part 21a and the ceiling lining 5 with a double-faced adhesive tape or the like.

It is configured such that a gap is less likely to be formed between the frame interposing material 11 and the ceiling lining 5 at the peripheral edge part 5b of the opening part 5a, and the gap is also less likely to be formed between the external peripheral part 21a of the frame 21 and the frame interposing material 11. Therefore, the space 6 between the top plate 3 and the ceiling lining 5, and the car cabin 1a can be blocked from each other by allowing the ceiling lining 5 to function as the baffle wall. Accordingly, when the vibrating plate 23 vibrates, the sound pressure is less likely to interfere between the interior of the car cabin 1a and the space 6, whereby the sound quality inside the car cabin 1a can be improved.

Also, since the central interposing material 12 formed of an elastic material is provided between the speaker 20 and the reinforcing material 4, vibration of the speaker 20 is less likely to be directly transmitted to the top plate 3 from the reinforcing material 4. Therefore, generation of unnecessary vibration sound can be prevented.

Next, on-vehicle acoustic devices 10B to 10D of other embodiments will be described. In the following description of other embodiments, elements that have the same structure as those of the on-vehicle acoustic device 10A shown in FIG. 1 are denoted with the same reference signs, and detailed explanation thereof is omitted.

In the on-vehicle acoustic device 10B of a second embodiment shown in FIG. 2, the central interposing material 12 shown in FIG. 1 is not used, and instead, a plurality of external peripheral interposing materials 13 is used. The external peripheral interposing materials 13 are formed of the same elastic material as the central interposing material 12.

Figure 3:
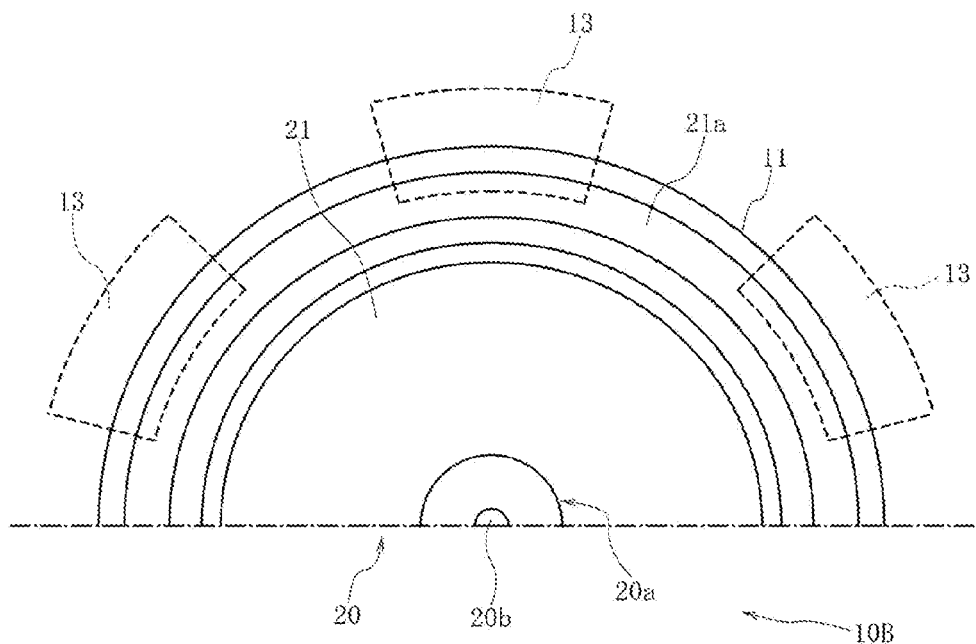
FIG. 3 is a plan view of the on-vehicle acoustic device of FIG. 2.

The external peripheral interposing materials 13 are interposed between a top plate 3 or a reinforcing material 4, and a ceiling lining 5 at a peripheral edge part 5b of an opening part 5a. As shown in FIG. 3, the several external peripheral interposing materials 13 are disposed at certain angle intervals along the peripheral edge part 5b of the opening part 5a.

It is desirable to fix each of the external peripheral interposing materials 13 and an internal surface 3b of the top plate 3 by an adhesive at a process after the opening part 5a is formed in the ceiling lining 5 and before a speaker 20 is disposed. Further, it is desirable to fix the external peripheral interposing material 13 and the ceiling lining 5 by an adhesive.

As shown in FIG. 2, while an external peripheral part 21a of a frame 21 of the speaker 20 is pressed against a frame interposing material 11, a fixing screw 15 is inserted into a fixing hole 20b of a central part 20a and is screwed to the reinforcing material 4. The external peripheral part 21a of the frame 21 is pressed against the frame interposing material 11 and the peripheral edge part 5b of the opening part 5a of the ceiling lining 5 is interposed between the external peripheral interposing material 13 and the external peripheral part 21a of the frame 21 along with the frame interposing material 11 by tightening the fixing screw 15. Therefore, the peripheral edge part 5b of the opening part 5a of the ceiling lining 5 and the external peripheral part 21a of the frame 21 can be firmly stuck together. Further, since a gap can be provided between a magnetic driving unit 22 of the speaker 20 and the reinforcing material 4, the vibration of the speaker 20 is less likely to be transmitted to the reinforcing material 4.

Figure 4:
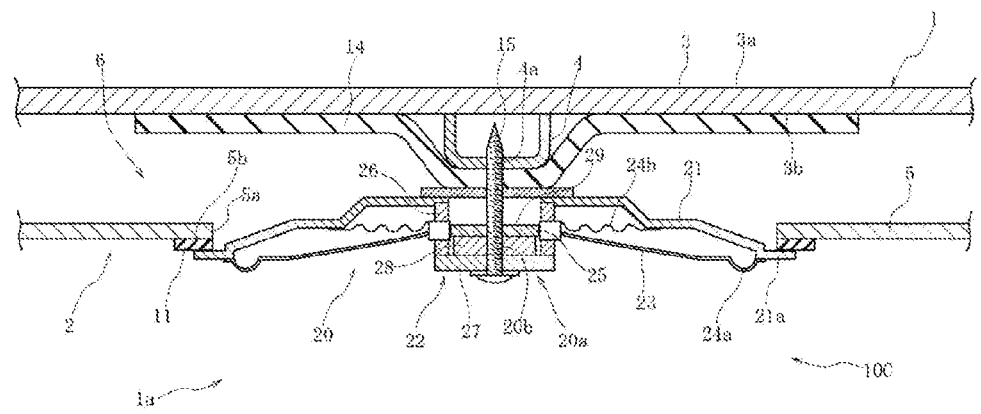
FIG. 4 is a cross-sectional view showing an on-vehicle acoustic device according to a third embodiment of the present invention.

The on-vehicle acoustic device 10C of a third embodiment shown in FIG. 4 includes a sound absorbent material 14 disposed at an internal surface 3b of a top plate 3. The sound absorbent material 14 functions as damping material and is formed of an elastic material such as synthetic rubber or foamed resin material.

The sound absorbent material 14 is larger than a speaker 20 in size and is disposed so as to cover the internal surface 3b of the top plate 3 and a reinforcing material 4. Further, at least a part of the sound absorbent material 14 is fixed to the top plate 3 by an adhesive or the like.

When the speaker 20 is mounted, a part of the sound absorbent material 14 is sandwiched between a central part 20a of the speaker 20 and the reinforcing material 4, and fixed between the central part 20a and the reinforcing material 4 by tightening force of a fixing screw 15. An effect of suppressing direct action of the vibration of the speaker 20 on the reinforcing material 4 can be exerted by the sound absorbent material 14, similar to the central interposing material 12 shown in FIG. 1.

Since the sound absorbent material 14 which is larger than the speaker 20 is provided at an inner side of the top plate 3 and the reinforcing material 4 inside a space 6 between the top plate 3 and a ceiling lining 5, sound pressure having a opposite phase to a phase given to the space 6 when a vibrating plate 23 vibrates can be absorbed and reduced by the sound absorbent material 14, whereby the vibration of the ceiling lining 5 can be suppressed and the sound effect inside the car cabin 1a can be enhanced.

Note that, in the embodiment shown in FIG. 4, the central interposing material 12 shown in FIG. 1 or the external peripheral interposing material 13 shown in FIG. 2 can be used along with the sound absorbent material 14.

Figure 5:
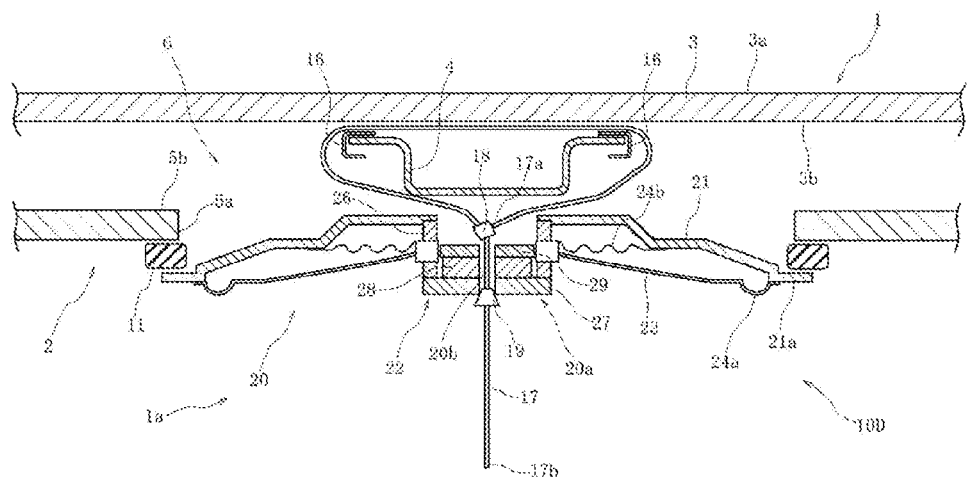
FIG. 5 is a cross-sectional view showing an on-vehicle acoustic device according to a fourth embodiment of the present invention.

In the on-vehicle acoustic device 10D of a fourth embodiment shown in FIG. 5, a speaker 20 is fixed to a reinforcing material 4 without using a fixing screw 15.

Supporting guides 16 are mounted on both of right and left edge parts of the reinforcing material 4. The supporting guides 16 are made of synthetic resin. The speaker 20 is fixed to the reinforcing material 4 using a fastening material 17. The fastening material 17 is wire rod or belt rail made of metal or synthetic resin. Lock members 18 and 19 are respectively provided at two parts of the fastening material 17. The lock members 18 and 19 have a function to prevent reversion of the fastening material 17 inserted thereto.

The lock member 18 is fixed to a first end part 17a of the fastening material 17. First, a second end part 17b of the fastening material 17 is inserted between the reinforcing material 4 and a top plate 3, and is inserted into the lock member 18 before mounting the speaker 20. The fastening material 17 is wound around the reinforcing material 4 and is fastened by pulling the second end part 17b while pressing the lock member 18 against the reinforcing material 4.

When the speaker 20 is disposed, the second end part 17b of the fastening material 17 is inserted into a fixing hole 20b of the speaker 20 from a side of a space 6 toward an inside of a car cabin 1a. Then, the second end part 17b is inserted into the lock member 19, and is pulled toward the inside of the car cabin 1a while the lock member 19 is pressed against the fixing hole 20b. Accordingly, a central part 20a of the speaker 20 is firmly fixed to the reinforcing material 4.

At this time, an external peripheral part 21a of a frame 21 of the speaker 20 is pressed against a peripheral edge part 5b of an opening part 5a of a ceiling lining 5 via a frame interposing material 11.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An on-vehicle acoustic device in which a speaker is mounted on a ceiling part of a vehicle, comprising:
   the speaker including:
      a frame supporting an outer periphery edge of a vibrating membrane;
      a central support part configured to support a magnetic driving unit, the magnetic drive unit adapted to drive the vibrating membrane; and
      a fixing aperture passing through the central support part;
   a top plate fixed to or integrally formed with a structural portion of the vehicle;
   a fixed reinforcing brace proximate to an inner side of the top plate;
   a ceiling lining configured to cover the top plate and the reinforcing brace;
   an opening formed in the ceiling lining and disposed proximate the reinforcing brace, the opening having a diameter smaller than a diameter of the frame;
   wherein a peripheral edge of the opening in the ceiling lining is pressed toward the top plate from an inside of a cabin of the vehicle along a circumferential periphery of the frame so that the central support part is positioned inside the opening of the ceiling lining, and the central support part is fixed to the reinforcing brace; and
   wherein upward urging of the circumferential periphery of the frame pressing against the ceiling liner causes tension about the opening formed in the ceiling liner so as to create an air baffle between the top plate and the ceiling liner.

2. The on-vehicle acoustic device according to claim 1, wherein a frame interposing material formed of an elastic material is provided between the circumferential periphery of the frame and the peripheral edge of the opening formed in the ceiling lining.

3. The on-vehicle acoustic device according to claim 2, wherein a central interposing material formed of an elastic material is disposed between the central support part and the reinforcing brace, and wherein a fixing screw inserted into the fixing aperture is screwed to the reinforcing brace so that the central support part is fixed to the reinforcing brace via the central interposing material.

4. The on-vehicle acoustic device according to claim 2, wherein an external peripheral interposing material formed of an elastic member is disposed between the top plate or the reinforcing brace, and a peripheral edge of the opening formed in the ceiling lining; and wherein a fixing screw inserted into the fixing aperture is screwed to the reinforcing brace so that a peripheral edge of the opening formed in the ceiling lining is interposed between the circumferential periphery of the frame and the external peripheral interposing material.

5. The on-vehicle acoustic device according to claim 2, wherein a sound absorbent material larger than the frame in area is provided at an inner side of the top plate and the reinforcing brace.

6. The on-vehicle acoustic device according to claim 2, wherein the central support part is fixed to the reinforcing brace with wire rod or belt rail inserted into the fixing aperture and wound around the reinforcing brace.

7. The on-vehicle acoustic device according to claim 1, wherein a central interposing material formed of an elastic material is disposed between the central support part and the reinforcing brace, and wherein a fixing screw inserted into the fixing aperture is screwed to the reinforcing brace so that the central support part is fixed to the reinforcing brace via the central interposing material.

8. The on-vehicle acoustic device according to claim 1, wherein an external peripheral interposing material formed of an elastic member is disposed between the top plate or the reinforcing brace, and the peripheral edge of the opening formed in the ceiling lining; and
wherein a fixing screw inserted into the fixing aperture is screwed to the reinforcing brace, so that the peripheral edge of the opening formed in the ceiling lining is interposed between the circumferential periphery of the frame and the external peripheral interposing material.

9. The on-vehicle acoustic device according to claim 1, wherein a sound absorbent material larger than the frame in area is provided at the inner side of the top plate and the reinforcing brace.

10. The on-vehicle acoustic device according to claim 1, wherein the central support part is fixed to the reinforcing brace with wire rod or belt rail inserted into the fixing aperture and wound around the reinforcing brace.

11. A method of assembling an on-vehicle acoustic device for mounting a speaker, the speaker including a frame supporting an outer periphery edge of a vibrating membrane and a central support part configured to support a magnetic driving unit, the magnetic driving unit adapted to drive the vibrating membrane, the acoustic device configured to support the speaker on a ceiling part of a vehicle having a top plate, and including a reinforcing brace provided at an inner side of the top plate, and a ceiling lining covering the top plate and the reinforcing brace, the method comprising:
forming an opening in the ceiling lining having a diameter smaller than a diameter of the frame; and
positioning the central support part inside the opening in the ceiling lining while a peripheral edge of the opening in the ceiling lining is pressed toward the top plate from an inside of a vehicle cabin at a circumferential periphery of the frame;
fixing the central support part to the reinforcing brace via a fixing aperture passing through the central support part upwardly urging of the circumferential periphery of the frame pressing against the ceiling liner to cause tension about the opening formed in the ceiling liner so as to create an air baffle between the top plate and the ceiling liner.

12. The method of assembling an on-vehicle acoustic device according to claim 11,
wherein a frame interposing material formed of an elastic material is disposed between the external peripheral part of the frame and the peripheral edge of the opening formed in the ceiling lining.

13. The method of assembling an on-vehicle acoustic device according to claim 12,
wherein a central interposing material formed of an elastic material is disposed between the central support part and the reinforcing brace, and
wherein a fixing screw inserted into the fixing aperture is screwed into the reinforcing brace so that the central support part is fixed to the reinforcing brace via the central interposing material.

14. The method of assembling an on-vehicle acoustic device according to claim 12,
wherein an external peripheral interposing material formed of an elastic member is disposed between the top plate or the reinforcing brace and the peripheral edge of the opening formed in the ceiling lining, and
wherein a fixing screw inserted into the fixing aperture is screwed into the reinforcing brace so that the peripheral edge of the opening formed in the ceiling lining is interposed between the circumferential periphery of the frame and the external peripheral interposing material.

15. The method of assembling an on-vehicle acoustic device according to claim 12,
wherein a sound absorbent material larger than the frame in area is provided at an inner side of the top plate and the reinforcing brace.

16. The method of assembling an on-vehicle acoustic device according to claim 12,
wherein the central support part is fixed to the reinforcing brace with wire rod or belt rail inserted into the fixing aperture and wound around the reinforcing brace.

17. The method of assembling an on-vehicle acoustic device according to claim 11,
wherein a central interposing material formed of an elastic material is disposed between the central support part and the reinforcing brace, and wherein a fixing screw inserted into the fixing aperture is screwed into the reinforcing brace so that the central support part is fixed to the reinforcing brace via the central interposing material.

18. The method of assembling an on-vehicle acoustic device according to claim 11,
wherein an external peripheral interposing material formed of an elastic member is disposed between the top plate or the reinforcing brace, and the peripheral edge of the opening formed in the ceiling lining; and
wherein a fixing screw inserted into the fixing aperture is screwed into the reinforcing brace so that the peripheral edge of the opening formed in the ceiling lining is interposed between the circumferential periphery of the frame and the external peripheral interposing material.

19. The method of assembling an on-vehicle acoustic device according to claim 11,
wherein a sound absorbent material larger than the frame in area is provided at the inner side of the top plate and the reinforcing brace.

20. The method of assembling an on-vehicle acoustic device according to claim 11,
wherein the central support part is fixed to the reinforcing material with wire rod or belt rail inserted into the fixing aperture and wound around the reinforcing material.

* * * * *